(12) United States Patent
Eckardt et al.

(10) Patent No.: US 6,370,682 B1
(45) Date of Patent: Apr. 9, 2002

(54) SYSTEM AND METHOD FOR DEVELOPING REUSABLE FLEXIBLE AND PLATFORM INDEPENDENT SOFTWARE USING COMPONENTS

(75) Inventors: Dieter Eckardt, Herzogenaurach; Gerald Amler, Nuremberg; Hans-Christian Doht, Erlangen; Hartmut Schorrig, Roettenbach, all of (DE); Franz Hackl, Vienna (AT); Reinhold Kugler, Neunkirchen (DE); Klaus-Dieter Renner, Nuremberg (DE); Manfred Mueller, Erlangen (DE)

(73) Assignee: Siemens Atkiengesellschaft, Munich (DE)

( * ) Notice: Subject to any disclaimer, the term of this patent is extended or adjusted under 35 U.S.C. 154(b) by 0 days.

(21) Appl. No.: 09/430,311

(22) Filed: Oct. 29, 1999

Related U.S. Application Data

(63) Continuation of application No. 09/397,020, filed on Sep. 15, 1999, now abandoned.

(51) Int. Cl.[7] .................................................. G06F 9/45
(52) U.S. Cl. .................................................. 717/1; 717/2
(58) Field of Search .............................. 717/1, 2, 3, 5, 717/10; 345/333

(56) References Cited

U.S. PATENT DOCUMENTS

| 5,754,858 A | * | 5/1998 | Broman et al. ............. 395/701 |
| 5,850,548 A | * | 12/1998 | Williams .................... 395/701 |
| 5,995,100 A | * | 11/1999 | Auslander .................. 345/335 |

* cited by examiner

Primary Examiner—Kakali Chaki
(74) Attorney, Agent, or Firm—Sughrue Mion, PLLC (57) ABSTRACT

Re-use and platform independence of application software is achieved by using component types comprising an interface and a body. This is followed by automatically generating components based on the developed component types. The development process steps are preceded by an adaptation process step, during which the functionality of all component types is defined for all the platforms.

19 Claims, 6 Drawing Sheets

SYSTEM AND METHOD FOR DEVELOPING REUSABLE FLEXIBLE AND PLATFORM INDEPENDENT SOFTWARE USING COMPONENTS

This is a Continuing Application of U.S. patent application Ser. No. 09/397,020, with a filing date of Sep. 15, 1999, now abandoned, the disclosure of which is incorporated into this application by reference.

DESCRIPTION OF THE INVENTION

1. Field of the Invention

The present invention relates to the development of modular software. Specifically, this invention is related to the development of software that is flexible and platform independent so that it can be reused without manually reworking. This invention is embodied in a system, method and a computer program product for a software model that uses components; and in a system, method and a computer program product that is used for converting a given software component that is flexible, reusable and platform-independent into a target specific executable form.

2. Background

Software that is created for a specific application often needs to be implemented over a wide range of hardware platforms. These hardware platforms often differ in their performance, electrical rating and several other parameters. It is infeasible to develop separate software for each hardware platform. Therefore, platform independence plays a critical role in enhanced usability of software. Control software that caters to variable speed drives is a good example of a software application that needs to be platform independent.

A possible solution to this problem would be to develop hardware that can operate at all ranges of operation. However, it is economically unfeasible to develop such a hardware platform that operates in all required performance ranges and electrical ratings. A complete hardware platform unit (including signaling electronics, mechanical parts, power electronics) at a lower performance class is cheaper to produce than only the signal electronics for a unit with a higher performance class. Additionally, different processors that function at different performance levels and electrical ratings are required. Further, either fixed point or floating point arithmetic needs to be used depending on the performance requirements. Combining operations at different performance ratings, therefore, would be excessively expensive.

In spite of having a range of hardware platforms, a vast majority of software functions need to be implemented across the entire range of hardware platforms. For example, variable speed drive signal processing software has to be implemented across the entire range of drive hardware platforms. In order for functions to be applicable across a range of hardware platforms, an important precondition is that these functions have to be similar. Therefore, software that implements these functions also has to be similar.

It should be noted that as better hardware platforms are developed, the functions implemented by a given piece of software need to have a larger scope. Such a large scope is required to service the resulting improved functionality. In our example related to high-speed drives, the functional scope of the software rises continuously with the performance requirements. Also, functions that could hitherto be employed only in high-performance equipment are now increasingly migrating to lower performance levels. For example, previously, multitasking could only be performed by a workstation. Presently, personal computers offer the capability to perform multitasking. Further, short product life of two to three years is normal in software development. Therefore, software has to be designed to be flexible enough to effectively support upgrades, technology enhancement and innovations. Clearly, development time and costs can be saved by re-use of the software.

Presently, software that implements a specific function across a range of hardware platforms is produced separately for each target system using a high-level language (generally C) and assembler. The target-system-specific characteristics are included in the software right from the beginning of software development. Porting such software to platforms other than that which the software was originally designed for becomes very difficult. Further, the additional changes made to the software for porting it to other platforms requires additional testing. This additional testing adds to the overall cost.

However, conventional systems that use components (e.g. SIMADYN D, SIMATIC) are not platform-independent. In such systems, porting to target hardware platforms other than that for which the software was created is still complex.

It should be noted virtual machines are normally not used in real-time systems, such as variable speed drives. This is because virtual machines require substantially more computing power and processing time.

SUMMARY OF THE PRESENT INVENTION

It is an object of the present invention to overcome the above-mentioned problems in porting software across multiple hardware platforms and to produce a clearly structured, easily maintainable software, whose capability is not affected even at high levels of complexity.

It is a specific object of the present invention to provide a system, method and a computer program product for developing software that is flexible and reusable across several hardware platforms. It is another object of the present invention to provide a system, method and computer program product for converting modular and system independent software into a target platform specific software in the form of an executable code.

In order to achieve the above-mentioned objects, there is provided a software system comprising one or more software components, an operating system connected to said one or more software components, said operating system controlling said one or more software components, each of said one or more software components having a limited functional scope and processing input data to form new output data, wherein each of said one or more software components is independent of other software components and produced in a reusable platform independent fashion, and wherein application software is created by graphically linking a subset of said one or more software components.

Preferably said one or more software components each perform a specific function, wherein said one or more software components further comprise parameters, a plurality of variables, input data and output data, wherein said variables can only be changed, if a component associated with a variable to be changed is called, wherein the parameters and the variables are stored in an area assigned to each said one or more software components and are completely encapsulated within each said one or more software components, said input and output data being used for bringing new data to and from the components.

Still preferably said component is initialized before being called for the first time.

Preferably each of said one or more software components is created by instantiating one or more platform independent software component types, each of said one or more software component types further comprises an interface file and a body file, wherein said interface file contains a definition of all said input data and output data and a definition of all local variables and information required for graphics configuration of each of said one or more software components, wherein said body is broken into individual segments, said individual segments reserving memory space for a sub-function associated with a corresponding component.

Preferably said software components can be connected together in a graphical way using a graphical interface program.

Another aspect of the present invention is a system for generating a target platform-specific software component from a platform-independent software component type, said component type comprising an interface and a body, said system comprising a component generator; an initialization file; a control file; and a script file, wherein said component generator further comprises a database; a controller; an analyser, and a synthesizer. Said analyser prepares necessary data and stores said necessary data in the database using data in the interface. Said synthesizer uses the stored data in the database and creates executable and compilable program code, wherein data in said control file is used to control operations of the analyser and synthesizer.

Preferably the system further comprises a target platform-specific compiler for compiling said source component into object components being input to an object library and a target platform specific linker for creating an executable code from the object components and the interface.

Yet another aspect of the present invention is a method of developing software comprising separating a required task to be performed by said software into mutually independent functionalities, designating separate software components to each of said functionalities and assigning parameters, variables, input data, output data for calculating functions associated with each of said separate software components.

Preferably the method of developing software comprises the additional step of storing the parameters and the variables associated with each of said separate software components to separate memory areas assigned to each of said separate software components.

Preferably the method of developing software comprises the additional step of creating an initialization function each for initializing each of said separate software components.

Preferably the method of developing software comprises the additional step of developing a process map each for each of said separate software components that stores all signals associated with each said separate software components.

Preferably the method of developing software comprises the additional step of developing event routines for each of said separate software components, each of said event routines being triggered when an associated event occurs.

Preferably, said components are reusable and platform independent.

Preferably each of said separate software components further comprises an interface file and a body file, wherein said interface file contains a definition of all said input data and output data and a definition of all local variables and information required for graphics configuration of said each component, wherein said body is broken into individual segments, said individual segments reserving memory space for a sub-function associated with each of said separate software components.

Preferably, each of said separate software components can be connected to other components using a graphical interface program.

Yet another aspect of the present invention is a method of generating a target platform-specific software component from platform-independent software component type, said method comprising creating an interface mask necessary to display the software component on a screen in a graphics engineering system; creating a target platform-specific source file and an appropriate header-file for performing a functionality associated with the software component; compiling the header file and a source file using a target-system specific compiler to create an object library; and linking the object library using specific information of the graphics engineering system to create an executable code.

Still another aspect of the present invention is a computer program product for developing software including a computer readable medium comprising a computer-readable separating code for separating a required task to be performed by said software into functions and designating separate software components to each of said functions, a computer readable assignor code for assigning parameters, variables, input data, output data for calculating functions associated with each individual component and storing the parameters and the variables associated with each component to separate memory areas assigned to each said component, a computer-readable initialization code for creating an initialization function each for initializing each said component, a computer-readable process map code for developing a process map each for each said component that stores all signals associated with each said component, and a computer-readable configuration code for configuring a process and associated calculations.

Still another aspect of the present invention is a computer program product for generating a target platform-specific software from platform-independent software components, including a computer readable medium comprising a computer-readable mask code for creating an interface mask necessary to display the software component on a screen specific to the target platform, a computer-readable source component code for creating a target platform-specific source component for performing a functionality associated with the software component, a computer-readable compiler code for compiling the interface mask and the source component using a target-system specific compiler to create an object library and a computer-readable linking code for linking the object library and the mask library to create an executable code.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF PREFERRED EMBODIMENTS OF THE INVENTION

Detailed descriptions of preferred embodiments of the invention are provided herein. It should be noted that a specific functionality, for example, addition, multiplication and integration as well as a state regulator, is independent of the target system. To achieve high flexibility and clarity, the overall functionality is composed of relatively smaller functional units. These relatively smaller functional units are referred to as "components" herein. It should be noted that the term "components" is distinguished from platform independent "component types" only when necessary. In all other cases, the general discussions regarding components are also valid for platform independent component types.

IVA. OVERALL ARCHITECTURE

Figure 1:
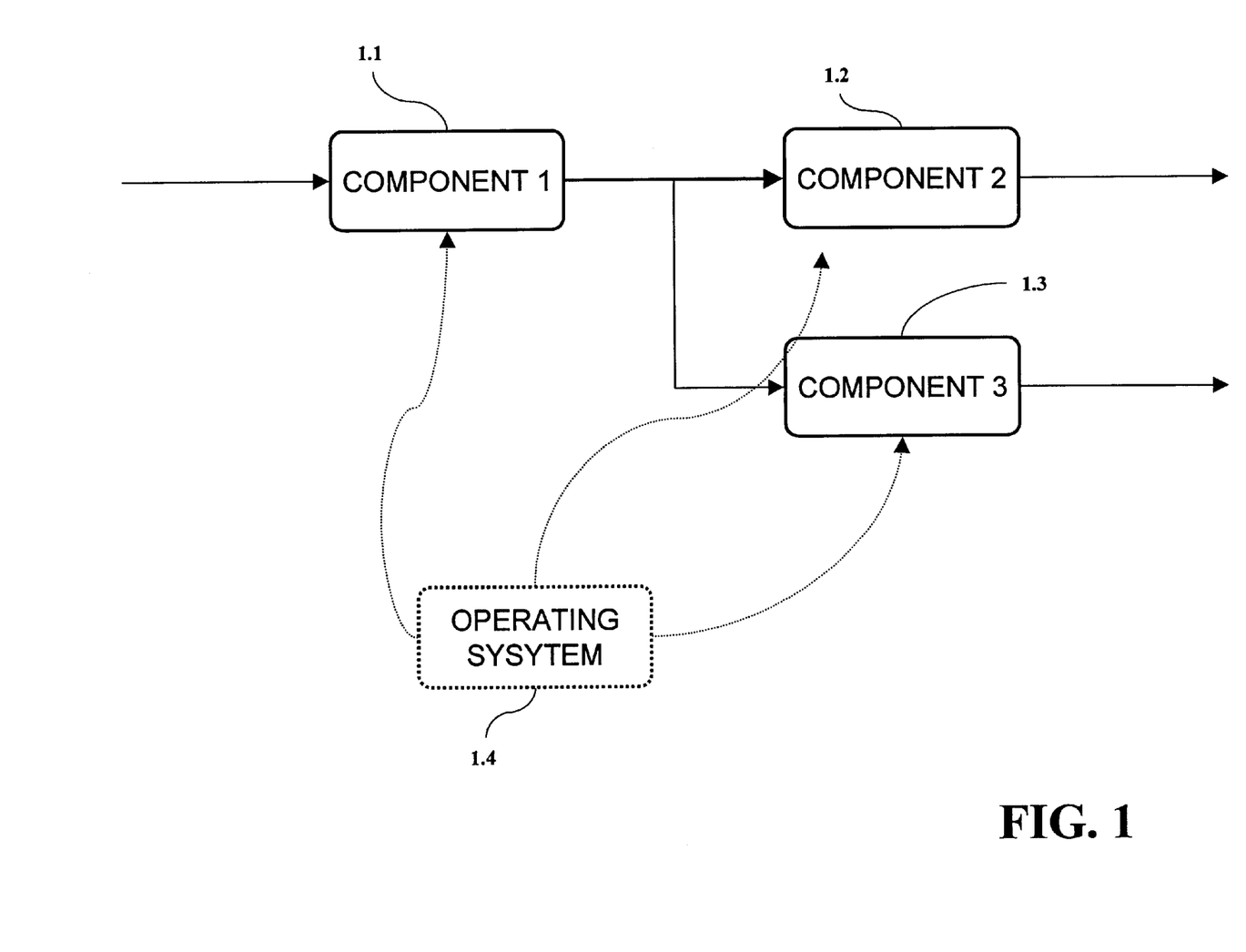
FIG. 1 shows a data flowchart depicting the interconnection of a number of components.

FIG. 1 shows a data flowchart depicting the interconnection of several components according to a preferred embodiment of the present invention. According to the present invention, the software is composed of individual software components 1.1–1.3 that are linked to one another using directional data flows, as shown in the data flowchart in FIG. 1. The links are produced graphically. Graphic editors can be used to create these links. An operating system 1.4 is connected to each of these components. The operating system invokes the individual components according to a sequence determined by the specific application. The operating system also controls the individual components in a deterministic fashion. Such a deterministic control is essential to meet the stringent real-time conditions. After being invoked by the operating system, an individual component processes the input data to create output data. A simple example of such an operating system is a well-known main program that calls the specific functions of a component.

IVB. DESCRIPTION OF INDIVIDUAL COMPONENTS

Figure 2:
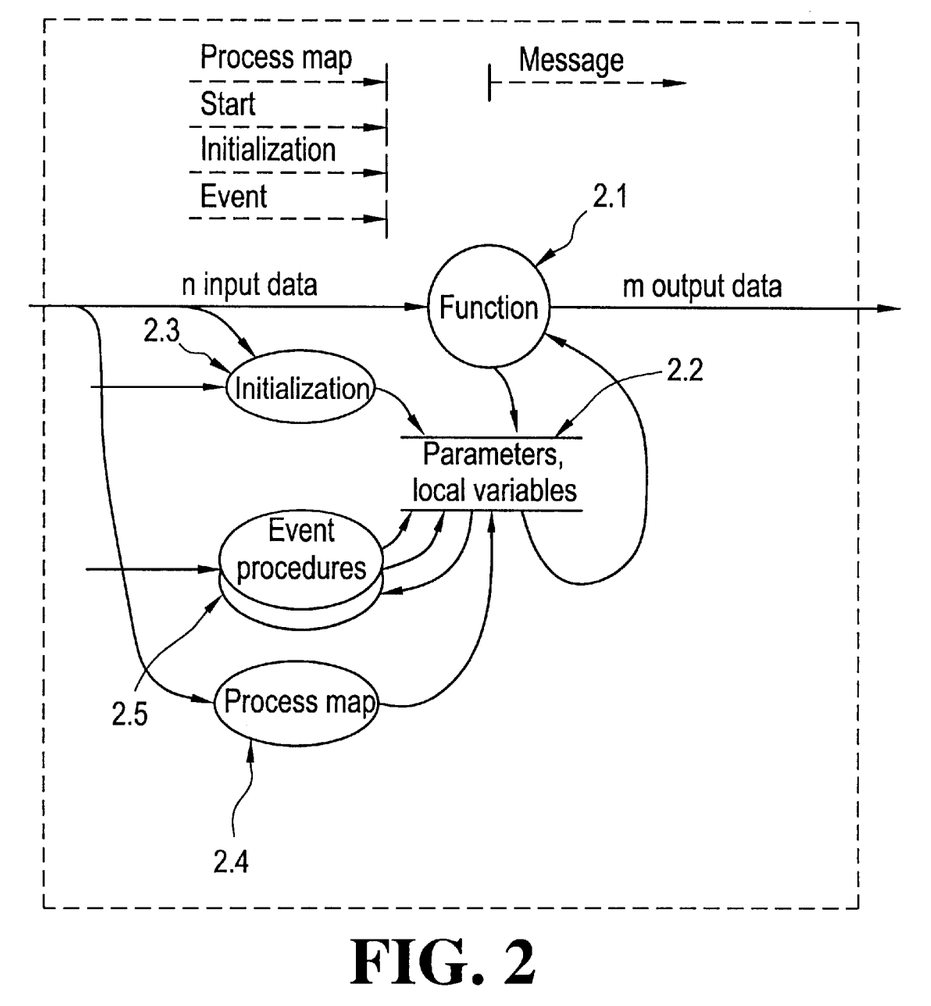
FIG. 2 shows a data flowchart for an individual component.

FIG. 2 shows a data flowchart for an individual component. As shown in this component, each component comprises a precisely delineated maximum functional scope. The functional scope of the component includes, importantly, the actual function 2.1 that a component is expected to perform. This function is in general associated with a specific task. Often this task is cyclic. In order to perform this task, several parameters and a number of variables 2.2 are required. Further, input and output data are required to calculate the function. These parameters and variables associated with a component remain unchanged from one invocation of the component to the next. Parameters can be changed by another process that is synchronized to the main function associated with a component. An example of such a variable is the content of the state variable of a digital integrator. Both the parameters as well as the related variables are kept in a memory area specifically assigned only to the particular component. By this process, the data are completely encapsulated. The component may include other temporary variables like stack variables.

Prior to being called for the first time, a component needs to be initialized. The initialization function 2.3 performs such an initialization. Normally, the initialization function is called only once. Initialization is generally dependent on the intended function of the component. Therefore, initialization can be regarded as part of the component function. The process map 2.4 stores all the present input signals at a specific time. The time is defined by the operating system using a latch function. The event procedures 2.5 are invoked by the operating system when it detects a specific event. An example of such an event is the change in value of a parameter.

An event procedure could be used for configuration. Normally, configuration is slow compared to the sampling time required to carry out a function. Configuration and the calculations associated with the configuration are therefore carried out only when necessary, and normally in the background, in order to save computation time.

For digital signal processing, it has been found that a functionality beyond the described function contents is not necessary for achieving the objectives of the present invention. Also, not more than four different function types are required to maintain the scope of the operating system functions. Further, such a limitation of the number of function types also helps in standardization of the operating system. An excessively large range of function types and their associated software components would prove to be impractical to manage.

The components are designed such that each individual component is a closed, configurable unit which has well-defined functionality, clear interfaces to the operating system and a clear and unique definition of the inputs and outputs. Each component is also not dependent on the functionality of other components.

It should also be mentioned that the components in FIG. 2 could also be regarded as objects, for the purposes of object-oriented programming. The functions and routines in the components correspond to the methods associated with objects. The data contained in the memory associated with the component corresponds to the attributes associated with objects. Moreover, the platform independent component description performs a class of all platform dependent instances of that component type.

The individual component shown in FIG.2 can also be divided based on functionality within a component, data input and output, and data stored in the local memory. An individual component is associated with two files; an interface file and a body file. The interface file contains the definition of all the inputs and outputs, as well as the definition of the local variables. Furthermore, all the information that is required for graphics configuration is stored in the interface file. A template is produced for the interface file in each of the component. The template contains a metalanguage describing the interface. This metalanguage is interpreted in the component generator, to produce both a mask for the graphics configuration interface and a header file for the body.

The body associated with each component is divided into individual segments. Each segment is reserved for particular function routines (initialization, the actual component function, process map and event procedures). The segments may be used optionally. It is not essential to implement corresponding functionality within each segment. Space is reserved in memory only if a specific function is present. This minimizes the overall memory requirement.

Since the respective functions are programmed within the body, standardization is required to achieve the desired re-usability and platform independence. This standardization can be achieved by using uniform programming guidelines. Such a guideline could state, for example, that only ANSI C is permitted as the programming language. Additionally, one can limit the scope of ANSI C to a subset of required language clients. The scope of the ANSI C language can be further limited such that it can be compiled without any problems using both ANSI C compilers and C++ compilers. Other essential elements, constituting such a programming guideline, are exact definitions of the data types used for the inputs, outputs and the local variables, the definition of a name convention, and the definition of a template for the body. Compliance with programming guidelines is checked by means of a code checker. It is preferable to do code checking automatically.

IVC. ARITHMETIC

Depending on the performance required, different types of processors can be used. Cost is an important factor in selecting the type of processor that needs to be used. Based on the processor selected, fixed point or floating point arithmetic is used. A generic set of arithmetic functions has been defined as part of the programming guideline. Defining such a generic set of functions allows for providing a standard description in the body of the component despite using different forms of arithmetic like fixed-point arithmetic and floating-point arithmetic. This enables the re-use of the source code once it has been produced.

The generic functions are used essentially to detect, or to prevent entirely, the numerical overflows that can occur with fixed-point arithmetic. These functions are thus preferably used only for fixed-point arithmetic, still preferably at critical steps in the computation. The generic functions are replaced by the functions that are actually required on the platform either at the component generator or by the use of object-oriented compilers that are fed with specific definition produced by the component generator. This conversion process also considers the data types used by the parameters associated with the respective functions, thus providing polymorphism. The target-system-specific functions themselves must be available in the form of a library. Providing such generic functions in a library will enable complete re-use of the components using fixed-point arithmetic, while at the same time providing a migration path toward floating point arithmetic. However, in general, there can be no reverse migration path from floating point arithmetic to fixed-point arithmetic, owing to the possibility of numerical overflows in fixed-point arithmetic. The same processing method is used to control external coprocessors for example external arithmetic coprocessors with specific data formats. One possibility is to use C++ compilers and the operation overload technique provided by this compiler. In such a case, the necessary class-definition is created by the component generator.

IVD. COMPONENT GENERATOR

The component generator is the tool required for producing target-system-specific software components from platform independent component-types. The component generator produces an instance of the component type. For producing target-specific software components, platform-specific data have to be included in the components during the generation process. Such data include, for example, translation of the data types used in the components to data types in a specific programming language. Furthermore, it is necessary to define how the links between the components are implemented using data. There are several options for implementing links, depending on the performance and the computation time required. These options extend from production of permanent links at the time of compiling, as is required for firmware, to the capability to insert and remove components using flexible links during run time.

Figure 3:
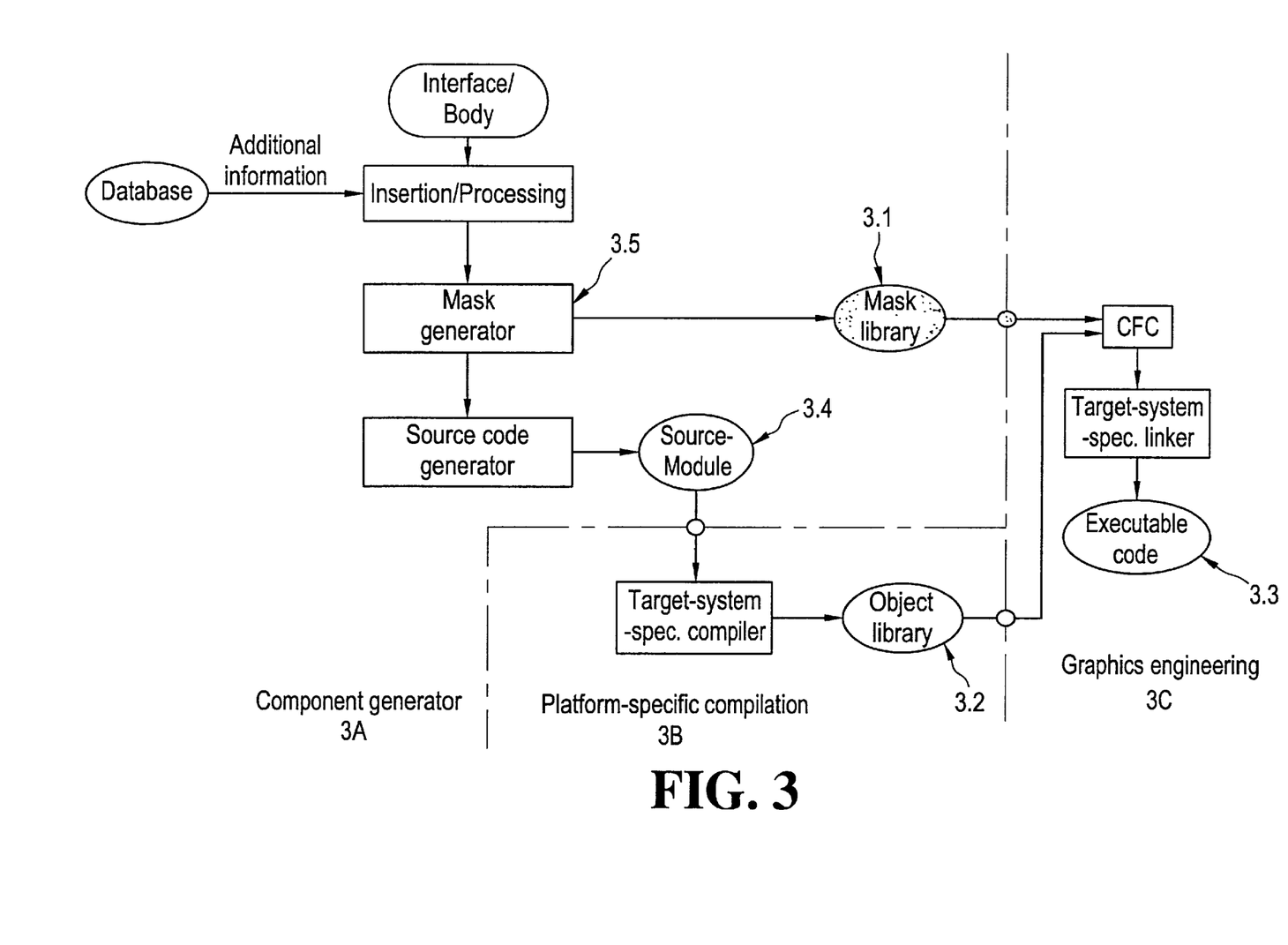
FIG. 3 shows a flowchart depicting how software is generated according to the present invention.

In principle, the component generator output supplies both a mask component, which is used to visualize the component on the graphics engineering interface, and the actual target-system-specific source component as shown in FIG. 3.

The source component includes an appropriate header file, which contains information from the interface as well as all the other target-system-specific information. It should be stressed again that the target-system-specific information included in the component during the generation process, does not lead to any change to the source code stored in the body. In fact, such information is included only in the header file that is produced. Finally, the source component produced this way still needs to be translated, using a target-system-specific compiler.

Depending on the platform and the connection technique used, both the mask component stored in the mask library 3.1 and the object component are stored in the object library 3.2. These components represent inputs for a graphics-engineering tool 3C. The output from the engineering tool then comprises either just one component 3.3, which essentially contains a list of connections, or a program, which is already linked and can run on the target system.

The process illustrated in FIG. 3 can be split into generation of the mask 3.5 and source component library 3.4, and the actual engineering. This means that it is possible to produce not only a generic product mask library 3.1, but also the associated (platform-specific) object component libraries 3.2. Both these components can then be used with a standard engineering tool. This will result in considerable customer use, since only one tool will be required for all the products.

Figure 4:
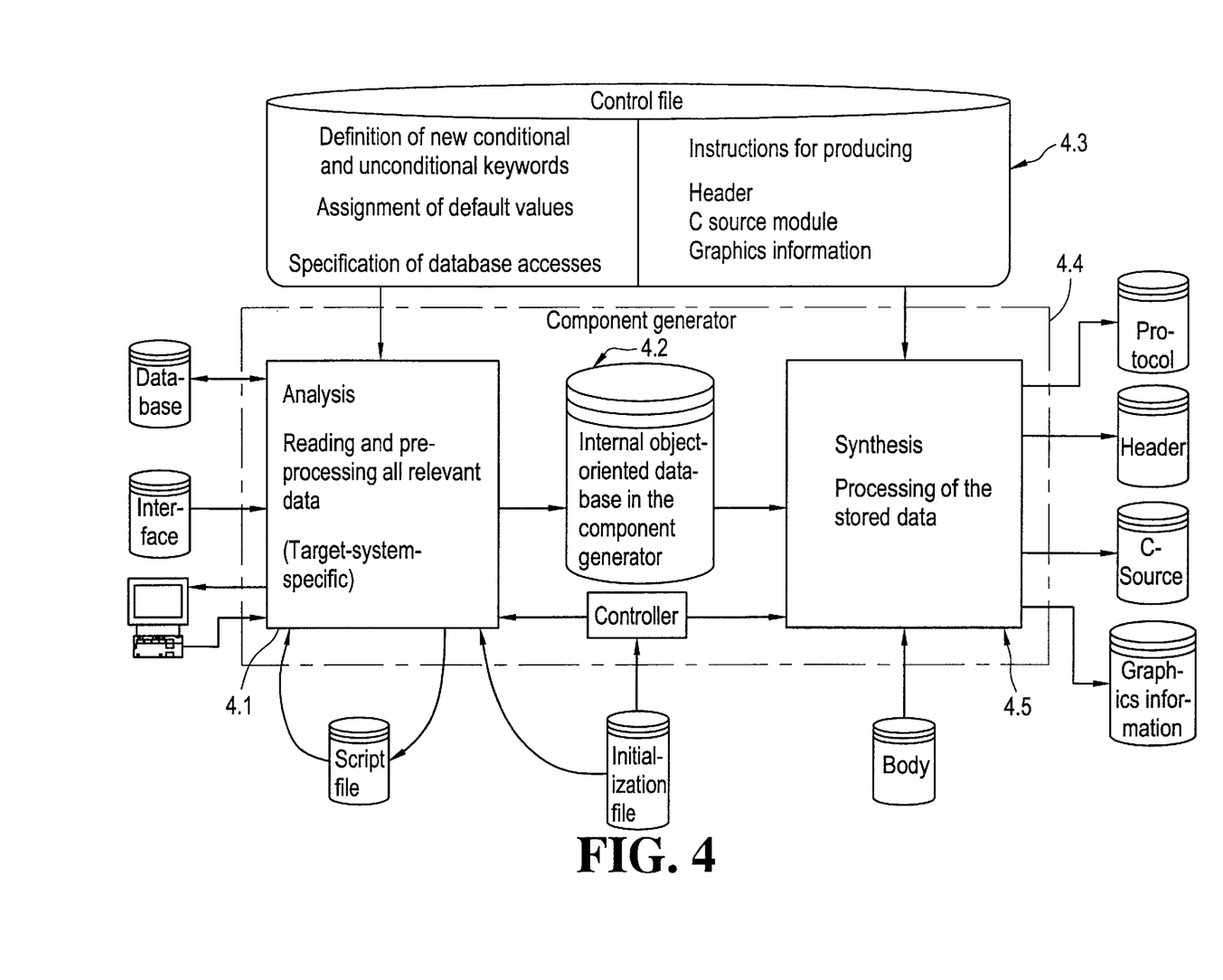
FIG. 4 shows a data flow diagram depicting components of a system including a component generator for converting a platform independent component type to a platform specific component.

A preferred embodiment of a system including a component generator that converts a platform independent component type into a platform specific component is shown in FIG.4. The component generator processes the information that is stored in the interface and in the body of the component type. This is done using a two-stage generation process. All the necessary data for the synthesis are prepared by the analyser 4.1 in an analysis phase. This data is stored in an internal database 4.2. To perform the analysis, the interface of the component type is analyzed and controlled using the details in the control file 4.3.

The additional information produced during the analysis is held in the internal database 4.2 in the component generator 4.4. Preferably, the component generator has the capability to read data from a relational database, by producing and storing SQL instructions. This is especially useful to enter platform-specific data into the component generator.

The executable and compilable program code, in the form of header files and C source files are produced by the synthesizer 4.5 in a synthesis step. In this synthesis step the data stored in the internal database 4.2 is used. If necessary, information required to display the component on a graphics configuration interface is also provided. This synthesis step is also controlled using information in the control file 4.3.

It should be mentioned that the special programming language used in the control file is defined in such a manner that the specific requirements of the component generator are met. These programming constructs correspond to functions required to output the values stored in the internal database and to create, for example, a header file. It is assumed that the specific information related to the inputs, outputs, state variables and to the component itself exist in the internal database. Appropriate loop elements and jump functions used for processing are based on the requirements of the specific language used in the control file.

It should be noted that these programming language constructs, respectively the control file, need be produced only once for each target platform. They need not be individually created for each generation process. The system also maintains a protocol file for storing the error messages and warnings produced by the generator. This protocol file is used for tracing back errors that occur.

FIG. 4 clearly shows that the body file of the component type is not required until the synthesis phase. This is because the body is merely added without actually changing the code performing the associated function. No analysis of the body is therefore required. These additions result in the C source module being produced from the body of the component type. This C source is capable of being translated together with the header that has likewise been produced, using a target-system-specific compiler.

It should also be noted that the component generator may be designed such that it can not only be operated interactively but can also be called completely from a batch file. In the latter case, a complete script file is, of course, a precondition.

Once an instantiation of the component in the form of a header and the associated C source module has been produced from the component type using the generation mechanism, the component now only needs to pass through the target-system-specific compiler, linker, and locator chain. Because of its capability to run in a batch mode as well, the component generator can also be included in the make mechanism.

Figure 5:
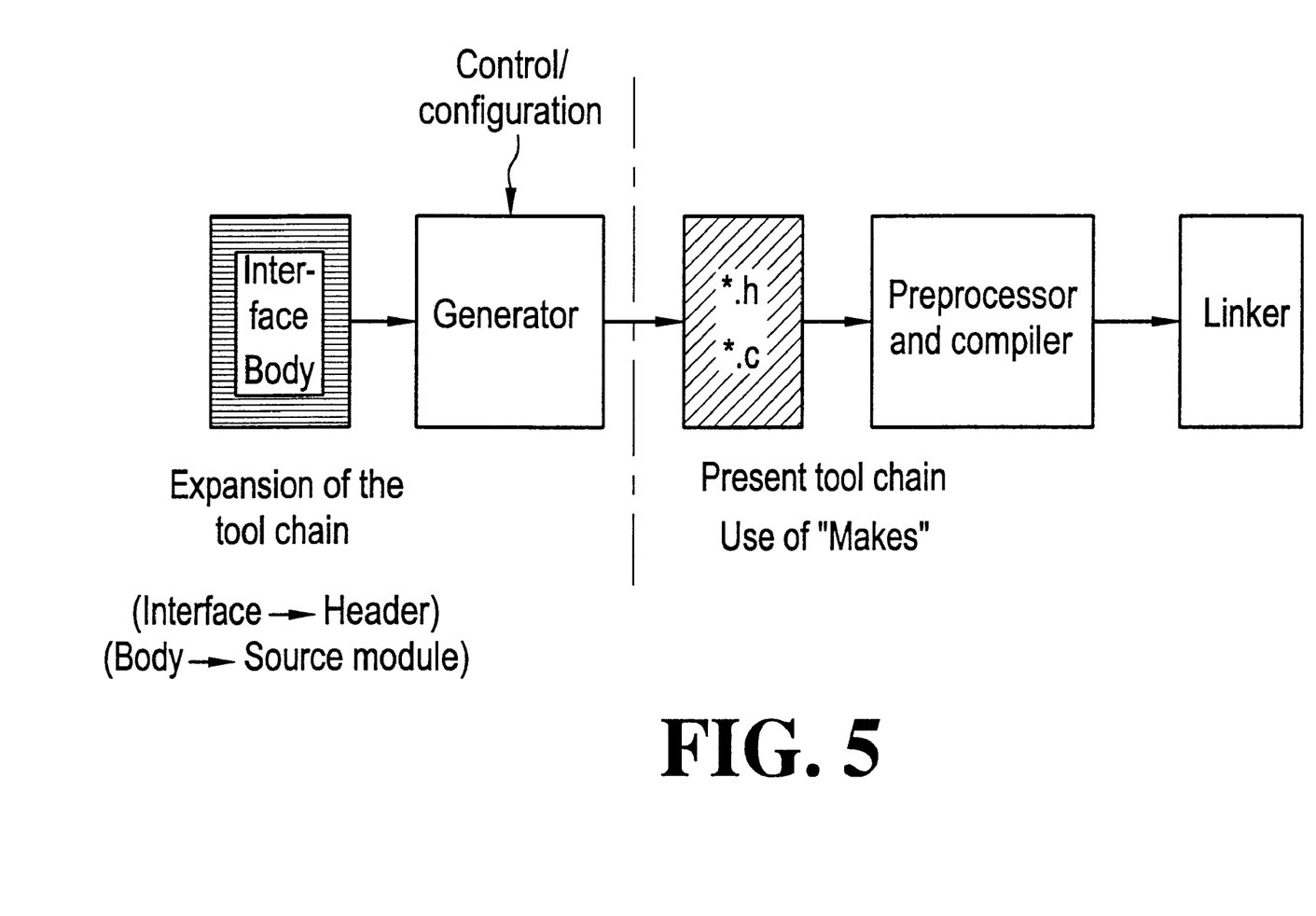
FIG. 5 shows the steps in compilation and linking of the components.

As shown in FIG. 5 a continuous tool chain is obtained. As compared to conventional methodologies, the body and interface are developed instead of the header and C source. The header and the source files are generated automatically. Further, the automatically generated header files and C files of the present invention can exist alongside conventionally produced header files and C files. Therefore, existing components can also be used together with the components produced from component types according to the present invention.

IVE. SIMULATION

It is advantageous to test software on a PC. A PC provides all aids required to intensively test the software before introducing the almost error-free software to the target platform. The present invention supports testing on a PC. Since the components can be transferred to different platforms using the generation process, they can be easily transferred to a PC as well.

Figure 6:
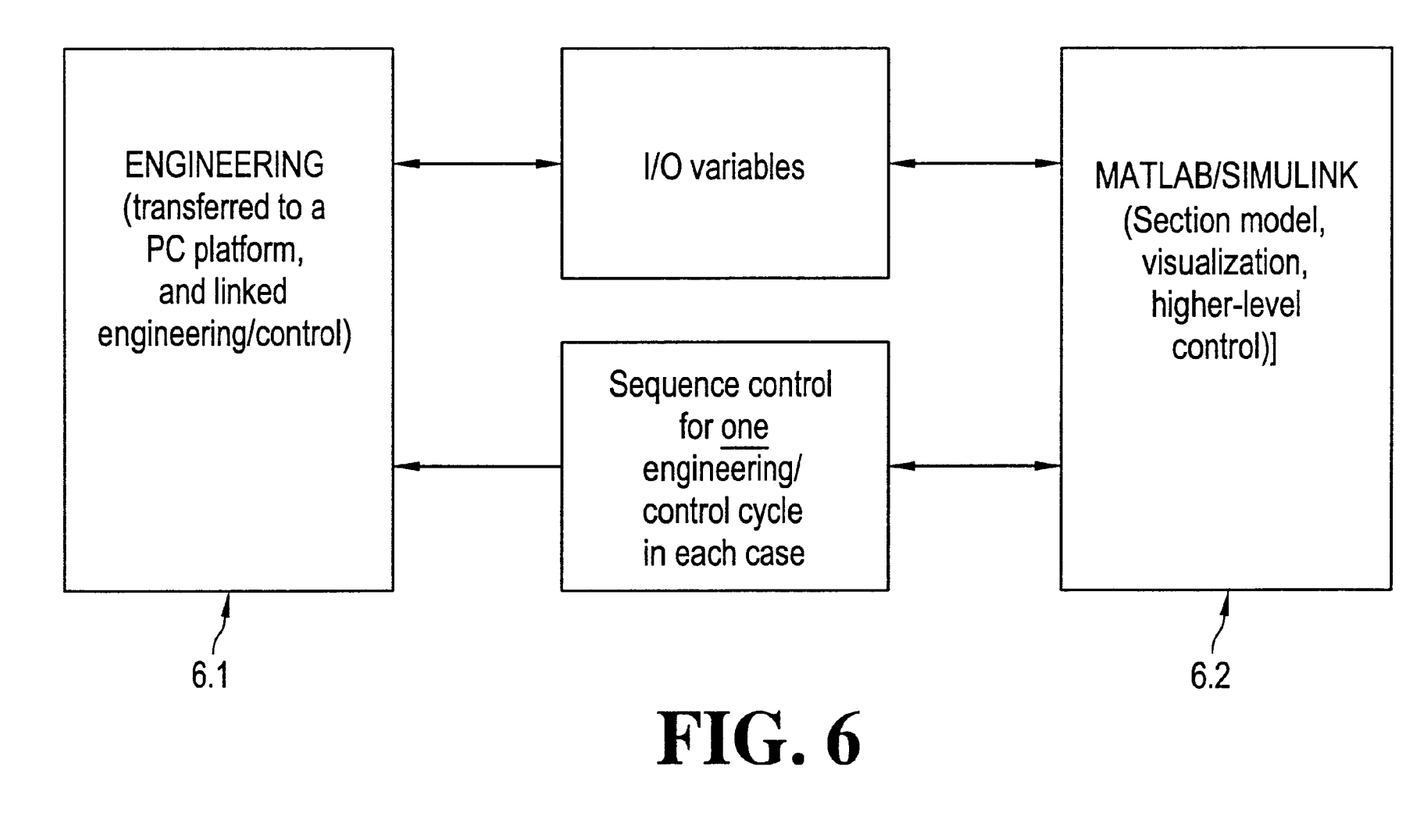
FIG. 6 shows how MATLAB is linked to engineering/control system ported to a PC.

The capability for off-line simulation is thus an important feature of the present invention. The only requirement is for the component generator to be suitable for producing an appropriate PC-specific output. FIG. 6 shows an example of such an approach. In this example, a link between the engineering 6.1 or control system produced using components and Matlab/Simulink 6.2 is shown.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention. Certain additional specifics as well as two specific examples illustrative of aspects of the present invention are disclosed in Siemens Technischer Bericht (Technical Report) SDE 4.99 TB 88, the disclosure of which is incorporated into the present application by reference.

What is claimed is:

1. A computer system comprising one or more software components, an operating system connected to said one or more software components, said operating system controlling said one or more software components, each of said one or more software components having a limited functional scope and processing input data to form new output data, wherein each of said one or more software components is independent of other software components and produced in a reusable platform independent fashion, and wherein application software is created by graphically linking a subset of said one or more software components.

2. The computer system of claim 1, wherein said one or more software components each perform a specific function, wherein said one or more software components further comprise a plurality of parameters, a plurality of variables, input data and output data, wherein said variables can be changed only if a component associated with a variable to be changed is called, wherein the plurality of parameters and the plurality of variables are stored in a memory area assigned to each said one or more software components, and wherein said parameters and said variables are completely encapsulated within each said one or more software components said input and output data being used for bringing new data to and from said one or more software components.

3. The computer system of claim 2, wherein each of said one or more software components is initialized prior to being invoked a first time.

4. The computer system of claim 1, wherein each of said one or more software components is created by instantiating one or more software component types, each of said one or more software component types further comprises an interface file and a body file, wherein said interface file contains a definition of all said input data and output data and a definition of all local variables and information required for graphics configuration of each of said one or more software components, wherein said body is broken into individual segments, said individual segments reserving memory space for a sub-functions associated with a corresponding component.

5. The computer system of claim 1, wherein said one or more software components are linked together graphically using a graphical interface program.

6. A computer system for generating a target platform-specific software component from platform-independent software component types, said component type comprising an interface and a body, said system comprising:
   a component generator;
   an initialization file;
   a control file; and
   a script file;
   wherein said component generator further comprises:
      a database;
      a controller;
      an analyzer, and
      a synthesizer;
   wherein said analyzer prepares necessary data and stores said necessary data in the database using data in the interface file and stores said necessary data in the database,
   wherein said synthesizer uses the stored data in the database and creates executable and compilable program code,
   wherein data in said control file is used to control operations of said analyzer and synthesizer.

7. The computer system of claim 6, further comprising a target platform-specific compiler for compiling said source component into object components being input to an object library and a target platform specific linker for creating an executable code from the object components and the interface mask.

8. A computer implemented method of developing software comprising:
   a) separating a required task to be performed by said software into mutually independent functionalities;
   b) designating separate software components to each of said functionalities;
   c) assigning parameters, variables, input data, and output data for calculating of functionality and scaling of said functionality associated with each of and
   d) creating the software by linking said software components.

9. The computer-implemented method of claim 8, further comprising:
   d) storing the parameters and the variables associated with each of said separate software components to separate memory areas assigned to each of said separate software components.

10. The computer-implemented method of claim 8, further comprising:
    d) creating an initialization function each for initializing each of said separate components.

11. The computer-implemented method of claim 8, further comprising:
    d) developing a process map each for each of said separate software components that stores all signals associated with each of said separate software components.

12. The computer-implemented method of claim 8, further comprising:
    d) developing event routines for each of said separate software components, each of said event routines being triggered when an associated event occurs.

13. The computer-implemented method of claim 8, further comprising:
    d) developing a configuration process and associated calculations.

14. The computer-implemented method of claim 8, wherein said components are reusable and platform independent.

15. The computer-implemented method of claim 8, wherein each of said separate software components further comprises an interface file and a body file, wherein said interface file contains a definition of all said input data and output data and a definition of all local variables and information required for graphics configuration of said each component, and wherein said body file is broken into individual segments, said individual segments reserving memory space for a sub-function associated with said each of said separate software components.

16. The computer-implemented method of claim 8, wherein each of said separate software components can be connected to other components graphically using a graphical interface program.

17. A computer-implemented method of generating a target platform-specific software component from platform-independent software component type, said method comprising:
    a) creating an interface mask necessary to display the software component on a screen in a graphics engineering system;
    b) creating a target platform-specific source file and an appropriate header-file for performing a functionality associated with the software component;
    c) compiling the header file and a source file using a target-system specific compiler to create an object library; and
    d) linking the object library using specific information of the graphics engineering system to create an executable code.

18. A computer program product for developing software including a computer readable medium comprising:
    a computer-readable separating code for separating a required task to be performed by said software into functions and designating separate software components to each of said functions;
    a computer readable assignor code for assigning parameters, variables, input data, output data for calculating functions associated with each individual component and storing the parameters and the variables associated with each component to separate memory areas assigned to each said component;
    a computer-readable initialization code for creating an initialization function each for initializing each said component;
    a computer-readable process map code for developing a process map each for each said component that stores all signals associated with each said component; and
    a computer-readable configuration code for configuring a process and associated calculations.

19. A computer program product for generating a target platform-specific software from platform-independent software components, including a computer readable medium comprising:
    a computer-readable mask code for creating an interface mask necessary to display the software component on a screen specific to a graphics engineering system;
    a computer-readable source component code for creating a target platform-specific source component for performing a functionality associated with the software component;
    a computer-readable compiler code for compiling the interface mask and the source component using a target-system specific compiler to create an object library; and
    a computer-readable linking code for linking the object library to create an executable code.

* * * * *